United States Patent [19]
Wernicke

[11] Patent Number: 5,435,502
[45] Date of Patent: Jul. 25, 1995

[54] FLYING AND ROAD VEHICLE

[76] Inventor: Kenneth G. Wernicke, 409 Circleview N., Hurst, Tex. 76054

[21] Appl. No.: 306,265

[22] Filed: Sep. 14, 1994

Related U.S. Application Data

[63] Continuation-in-part of Ser. No. 8,662, Jan. 25, 1993.

[51] Int. Cl.⁶ .............................................. B64C 37/00
[52] U.S. Cl. ......................................... 244/2; 244/36; 244/199; 244/45 R
[58] Field of Search .................. 244/2, 13, 36, 199, 244/91, 45 R, 50

[56] References Cited

U.S. PATENT DOCUMENTS

| | | |
|---|---|---|
| 1,968,497 | 7/1934 | Magalis . |
| 1,980,246 | 11/1934 | Austin . |
| 2,316,885 | 4/1943 | Ortega . |
| 2,406,625 | 8/1946 | Oglesby . |
| 2,681,773 | 6/1954 | Rethorst . |
| 3,090,581 | 5/1963 | Einarsson . |
| 3,265,329 | 8/1966 | Postelson . |
| 4,205,810 | 6/1980 | Ishimitsu . |
| 4,440,361 | 4/1984 | McGann . |
| 4,478,380 | 10/1984 | Frakes . |
| 4,881,701 | 11/1989 | Bullard . |
| 4,899,954 | 2/1990 | Pruszenski, Jr. . |
| 4,913,375 | 4/1990 | Fitzpatrick . |
| 5,100,081 | 3/1992 | Thomas . |

FOREIGN PATENT DOCUMENTS

| | | |
|---|---|---|
| 795663 | 10/1968 | Canada . |
| 1397402 | 3/1965 | France . |
| 62-99202 | 5/1987 | Japan . |
| 825442 | 12/1959 | United Kingdom . |

Primary Examiner—Galen L. Barefoot
Attorney, Agent, or Firm—James E. Bradley

[57] ABSTRACT

A vehicle will serve as a road vehicle, as well as can be flown. The vehicle has a fuselage and a wing with a fixed span. The aspect ratio is low, allowing the vehicle to be operated on a normal roadway. An upper winglet extends upward from each side edge of the wing. A lower winglet extends downward from each side edge. Wheels mount to the lower edges of the lower winglets.

6 Claims, 6 Drawing Sheets

5,435,502

FLYING AND ROAD VEHICLE

CROSS-REFERENCE TO RELATED APPLICATION

This application is a continuation-in-part of application Ser. No. 08/008,662, filed Jan. 25, 1993, FLYING AND ROAD VEHICLE.

BACKGROUND OF THE INVENTION

1. Field of the Invention

This invention relates in general to vehicles capable of flight, as well as driving on roadways.

2. Description of the Prior Art

There has been a long need for a vehicle that could be flown, as well as driven on roadways like a conventional motor vehicle. One problem in achieving such a result is in how to accommodate the wing span. Typical wing span of an airplane is far too wide for legal use on highways. Normally, 8½ feet is the maximum width for highway use, with 10 feet being allowed under some exceptions. The wing span of a typical 2 or 4 passenger aircraft would be far in excess of that amount.

One proposal in the past was to detach the wings from the fuselage upon landing. The fuselage then would be driven as a land vehicle. Other proposals in the patented art include having sections along the wing which will extend for flight. For various reasons, there are no currently marketed vehicles which will accomplish both flight, as well as being normally driven on a roadway.

SUMMARY OF THE INVENTION

In this invention, the vehicle has wings which extend out from each side of the fuselage. The wings have a fixed span, which is the distance from one side edge to the other. The wings have also a fixed chord, which is the distance from the leading edge to the trailing edge. The aspect ratio of the span over the chord is low, preferably less than one. The low aspect ratio allows the vehicle to be used as a road vehicle.

For stability and performance, an upper winglet extends upward from each side edge. Flight control surfaces are mounted on the trailing edges of the wings. The landing gear and/or wheels are driven by independent hydraulic motors.

In a preferred embodiment, a lower winglet extends downward from each outer edge of the wing. At least one of the wheels or landing gear mechanisms locates at the lower end of each lower winglet. In one embodiment, an aerilon locates at the trailing edge of each lower winglet.

BRIEF DESCRIPTION OF THE DRAWINGS

FIG. 9 is a side view of a portion of an alternate embodiment of the vehicle of FIG. 1.

DETAILED DESCRIPTION OF THE INVENTION

Figure 1:
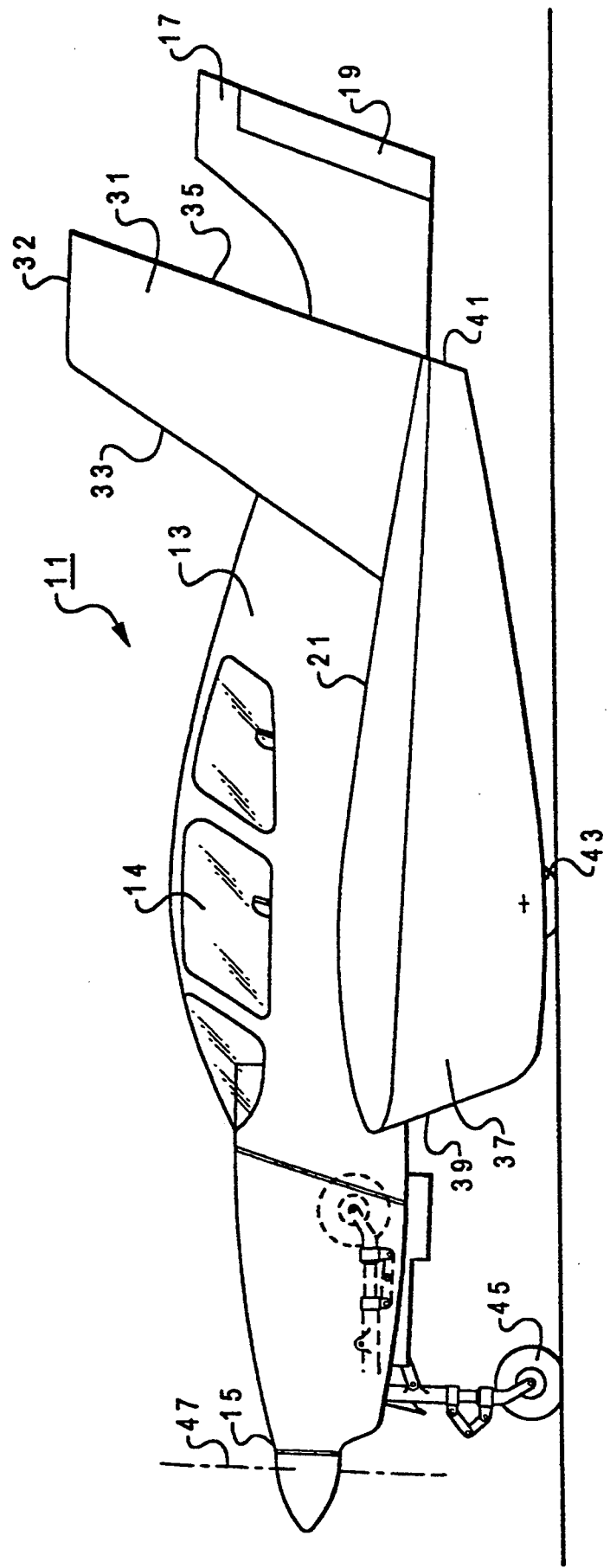
FIG. 1 is a side view of a vehicle constructed in accordance with this invention.

Referring to FIG. 1, vehicle 11 has a fuselage 13. Fuselage 13 has a general shape of a fixed-wing aircraft. It has a cabin 14 for at least two persons and containing the control system for driving and flying vehicle 11.

Fuselage 13 has a nose 15 and, on the opposite end, a tail 17. In the preferred embodiment, tail 17 extends upward from fuselage 13 and comprises a vertical airfoil surface. Also, in the embodiment shown, a rudder 19 locates conventionally on the trailing edge of tail 17.

Figure 2:
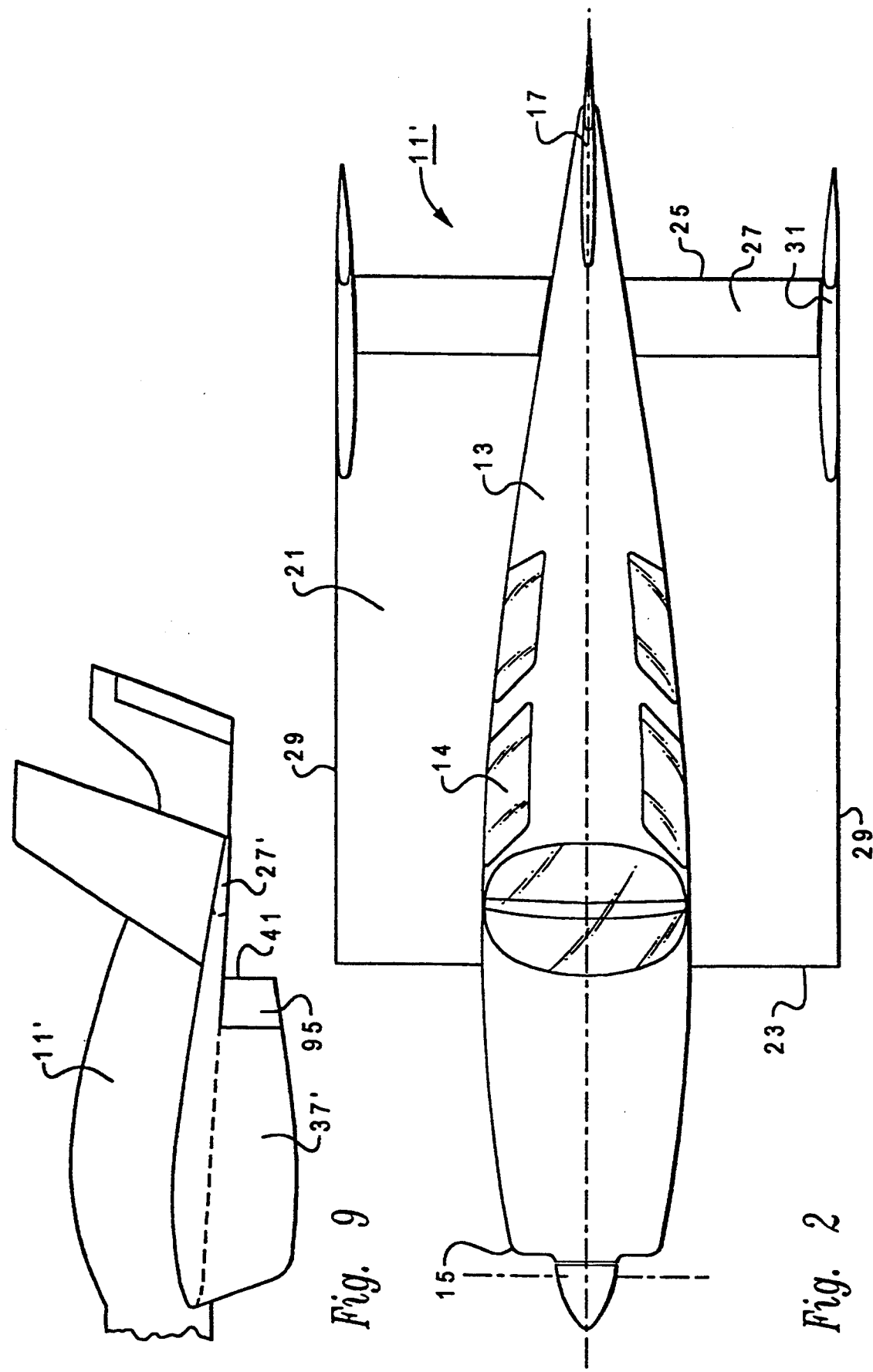
FIG. 2 is a top view of the vehicle of FIG. 1.

Referring also to FIG. 2, vehicle 11 has a wing 21 which extends outward from each side of fuselage 13. Wing 21 has a leading edge 23 located generally at the forward end of cabin 14. Wing 21 extends continuously and smoothly back to a trailing edge 25. Preferably elevons 27 locate at the trailing edge 25. Elevons 27 can be moved upward and downward in unison to serve as elevators. Also, they can be moved independently, as illustrated by the dotted lines in FIG. 4 to serve as aerilons for controlling roll. Wing 21 has two side edges 29 that are parallel to each other and parallel to the longitudinal axis of fuselage 13.

Wing 21 has a low aspect ratio. That is, its span over its chord is very low. The span is the distance from outer edge 29 to the opposite outer edge 29. The chord is the distance from leading edge 23 to trailing edge 25. The aspect ratio is in the range from 0.5 to 1.0, and preferably about 0.75. The width of fuselage 13 at its widest point is typically less than ½ the span of wing 21. Preferably, for a two passenger vehicle 11, the span does not exceed the 8½ feet legal limit for highway driving. For a four passenger vehicle 11, the span preferably does not exceed 10 feet. The thickness of wing 21 is fairly thin, preferably having a ratio of the thickness over the chord in the range from 6 to 12 percent, and preferably 9 percent.

Referring again to FIG. 1, an upper winglet 31 extends upward from each side edge 29. Upper winglet 31 resembles an airplane tail section in configuration. It is an airfoil surface, parallel to tail 17 and generally perpendicular to wing 21. Upper winglets 31 have no movable flight control surfaces. Upper winglet 31 has a leading edge 33 that is preferably inclined and a trailing edge 35 that is also inclined, but at a lesser degree of inclination. Upper winglet 31 and leading edge 33 can alternately be swept forward to any shape for styling. Leading edge and trailing edge 35 converge toward each other, resulting in an upper edge 32 on upper winglet 31 that is smaller in chord dimension than the base of upper winglet 31 where it joins wing 21. Leading edge 33 is located a considerable distance rearward of wing leading edge 23. Upper winglet trailing edge 35 locates at or forward of wing trailing edge 25. Preferably, upper winglet trailing edge 35 locates at wing trailing edge 25, but trailing edge 35 could be located forward of trailing edge 25.

The height or vertical extent of upper winglet 31 from the upper surface of wing 21 to upper edge 32 is about 0.3 to 0.65 times the span of wing 21. If below the range, the upper winglet 31 is not sufficient to enhance lift efficiency significantly. If above the range, the upper winglet 31 would provide too much roll stability, leading to roll oscillations. Also, the upper winglet 31 would possibly be too tall to allow the vehicle to be parked in a conventional automobile garage if above the range.

The chord of upper winglet 31 from leading edge 33 to trailing edge 35 varies, decreasing from the junction with wing 21 to upper edge 32. The chord at the median or halfway point between the base and upper edge 32 is in the range of 0.2 to 0.6 times the chord of wing 21, and preferably 0.25 times the chord of wing 21. If the chord is below the range, the upper winglet 31 would not be large enough to avoid stalling. Too much airflow from the lower side of wing 21 to the upper side would occur. If the chord is above the range, too much friction drag is created relative to the advantages of the upper winglet 31 in reducing induced drag due to lift.

In the preferred embodiment, a lower winglet 37 extends downward from each side edge 29, as shown in FIG. 1. Each lower winglet 37 is an airfoil or streamlined shaped surface, extending vertically downward, generally perpendicular to wing 21. Also, each lower winglet 37 is generally in the same plane as an upper winglet 31. In the embodiment of FIGS. 1-8, lower winglet 37 has a leading edge 39 that coincides with wing leading edge 23. The trailing edge 41 coincides with wing trailing edge 25. Consequently, in this embodiment, the chord of lower winglet 37 is the same as the chord of wing 21.

The chord of lower winglet 37 may be less, terminating forward of wing trailing edge 25, as illustrated in the embodiment of FIG. 9. The chord of lower winglet 37 is in the range from 0.4 to 1.0 times the chord of wing 21. It is also preferred to have the trailing edge 41 of lower winglet 37 at least as far aft from wing leading edge 23 as the distance from upper winglet leading edge 33 to wing leading edge 23. In other words, the distance from the base of upper winglet leading edge 33 to wing leading edge 23 should be no greater than the distance from lower winglet trailing edge 41 to wing leading edge 23.

The lower edge of lower winglet 37 is a gradual curve, with the vertical height of vertical winglet 37 decreasing toward the trailing edge 41. The maximum height or vertical extent of lower winglet 37 is in the range of 0.25 to 0.35 times the span of wing 21. Lower winglet 37 thus has a maximum vertical height that is less than the height of upper winglet 31.

Figure 3:
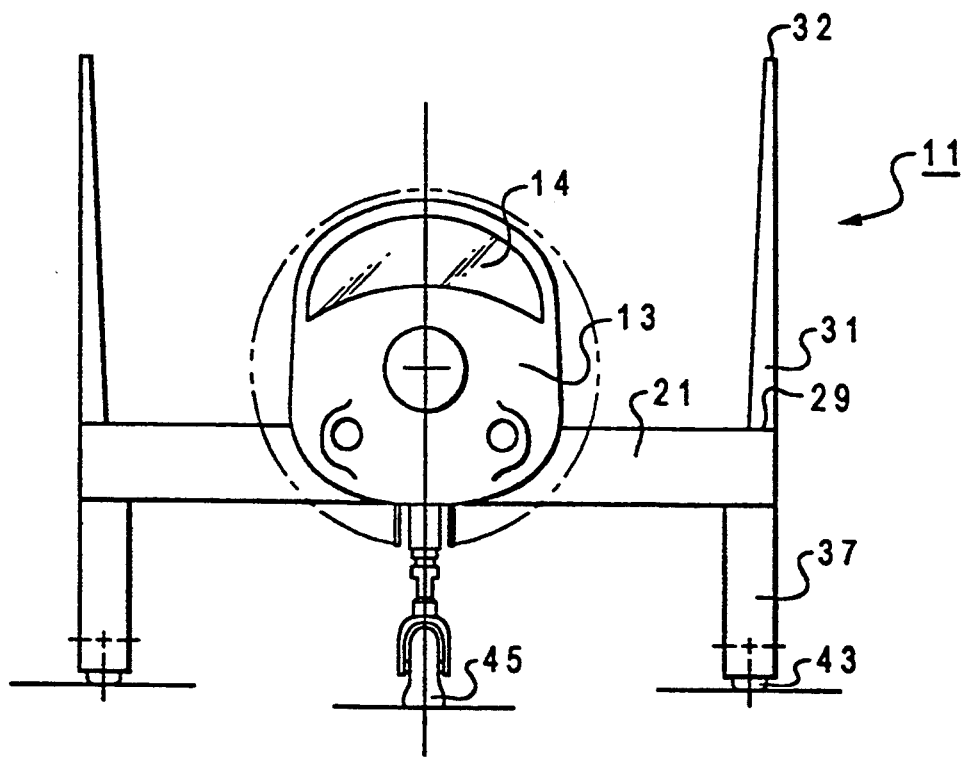
FIG. 3 is a front view of the vehicle of FIG. 1.
Figure 4:
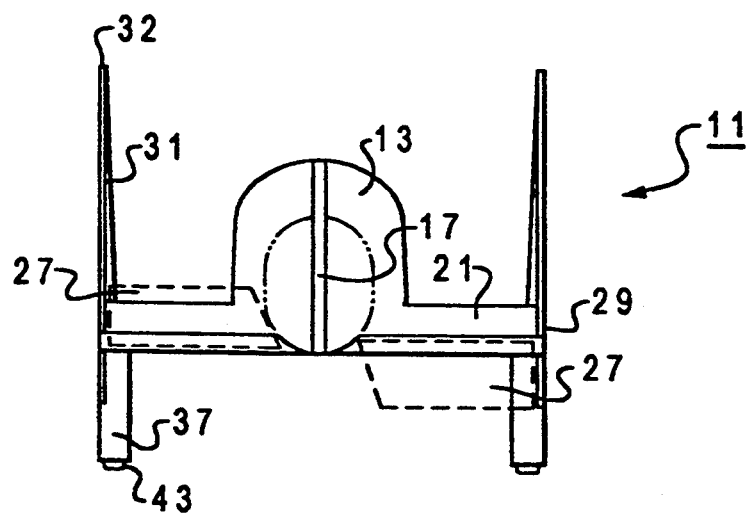
FIG. 4 is a back view of the vehicle of FIG. 1.

Referring to FIG. 1, as well as FIG. 3, a landing gear wheel 43 locates at the lower edge or end of each lower winglet 37. Wheel 43 may be fixed so as to protrude slightly below the lower edge of lower winglet 37 as shown. Alternately, it may be a retractable type that will retract fully into lower winglet 37. As shown in FIGS. 3 and 4, lower winglet 37 has sufficient lateral thickness to accommodate a wheel, thus serving also as a fairing.

A steerable nose landing gear wheel 45 locates at the forward portion of fuselage 13. Nose wheel 45 preferably retracts, as indicated by the dotted lines of FIG. 1. The vehicle 11, while flying, is driven by a propeller 47. Propeller 47 is powered by an engine 49, illustrated in FIGS. 5 and 6. Engine 49 may be of a variety of types, such as water cooled, air cooled, four stroke, two stroke, rotary or gas turbine. Additionally, two engines could be utilized, rather than one as shown.

Propeller 47 is mounted to a shaft 51 that is generally parallel to the longitudinal axis of vehicle 11. Shaft 51 may be selectively rotated with engine 49 or locked in position. The means for handling this includes a clutch 53, which is illustrated schematically in FIG. 6 as part of a planetary reduction gearbox. The gearbox has a pinion gear carrier 52 which has pinion gears that engage a gear on the engine shaft 56. A ring gear 54 engages the pinion gears and locates between clutch shoes or plates 55. The propeller shaft 51 is secured to the pinion gear carrier 52 for rotation therewith. When clutch plates 55 are gripping ring gear 54, pinion gear carrier 52 will be driven by engine shaft 56, driving propeller 47. When shoes 55 release ring gear 54, the engine shaft 56 will spin the pinion gears on the pinion gear carrier 52, causing the ring gear 54 to spin, thereby preventing any torque from being applied to carrier 52. Propeller 47 will not be driven by engine 49 when shoes 55 release ring gear 54. A brake 57 will selectively lock the shaft 51 to prevent propeller 47 from spinning while the vehicle is being driven on the ground. The use of a planetary reduction is illustrative; other means for clutching and locking could be used, as well.

Figure 5:
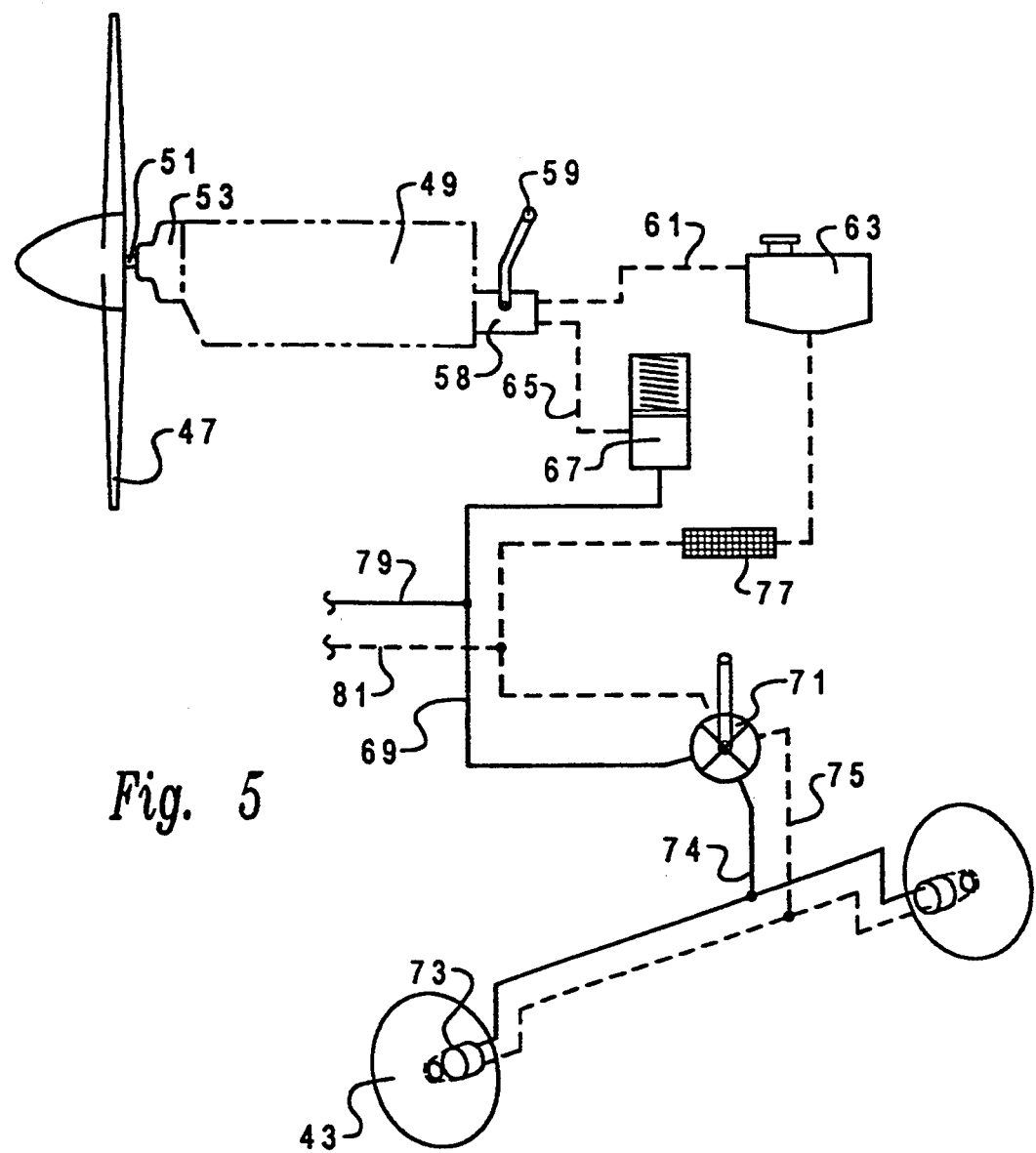
FIG. 5 is a schematic view illustrating the hydraulic drive system of the vehicle of FIG. 1.
Figure 6:
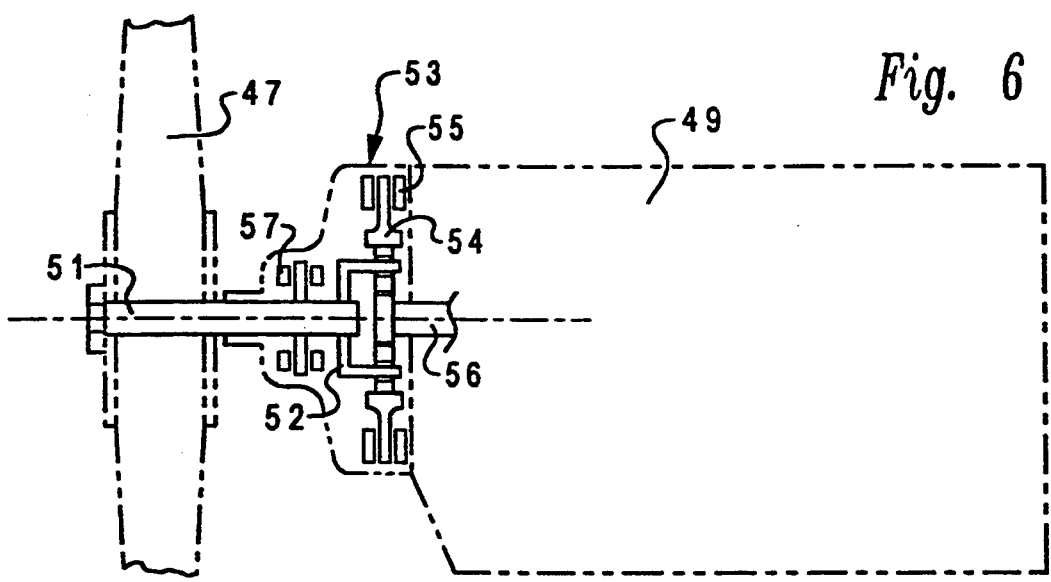
FIG. 6 is a schematic view illustrating a propeller clutch mechanism for the vehicle of FIG. 1.

Referring to FIG. 5, the means for causing the wheels 43 and 45 to rotate independently of propeller 47 comprises a hydraulic pump 58. Hydraulic pump 58 is driven by engine 49. A control rod 59, either automatic or manual, serves as a displacement control for hydraulic pump 58. Hydraulic pump 58 connects by a line 61 to a reservoir 63 for receiving fluid. Pump 58 pumps fluid out line 65 to an accumulator 67. The fluid flows out a line 69 to a reversing valve 71. Reversing valve 71 connects to a hydraulic motor 73 on each of the wheels 43 through line 74. Fluid returns through line 75. Reversing valve 71 can be reversed to operate motors 73 in reverse, transmitting fluid through line 75 to motors 73 in the reverse direction, rather than line 74. This allows the vehicle 11 to drive backwards.

The return flows through an oil cooler 77 back to reservoir 63. Lines 79 and 81 connect the hydraulic drive system to hydraulic powered accessories. As an alternate, nose wheel 45 could have a hydraulic motor (not shown) for driving in place of wheels 43.

Figure 7:
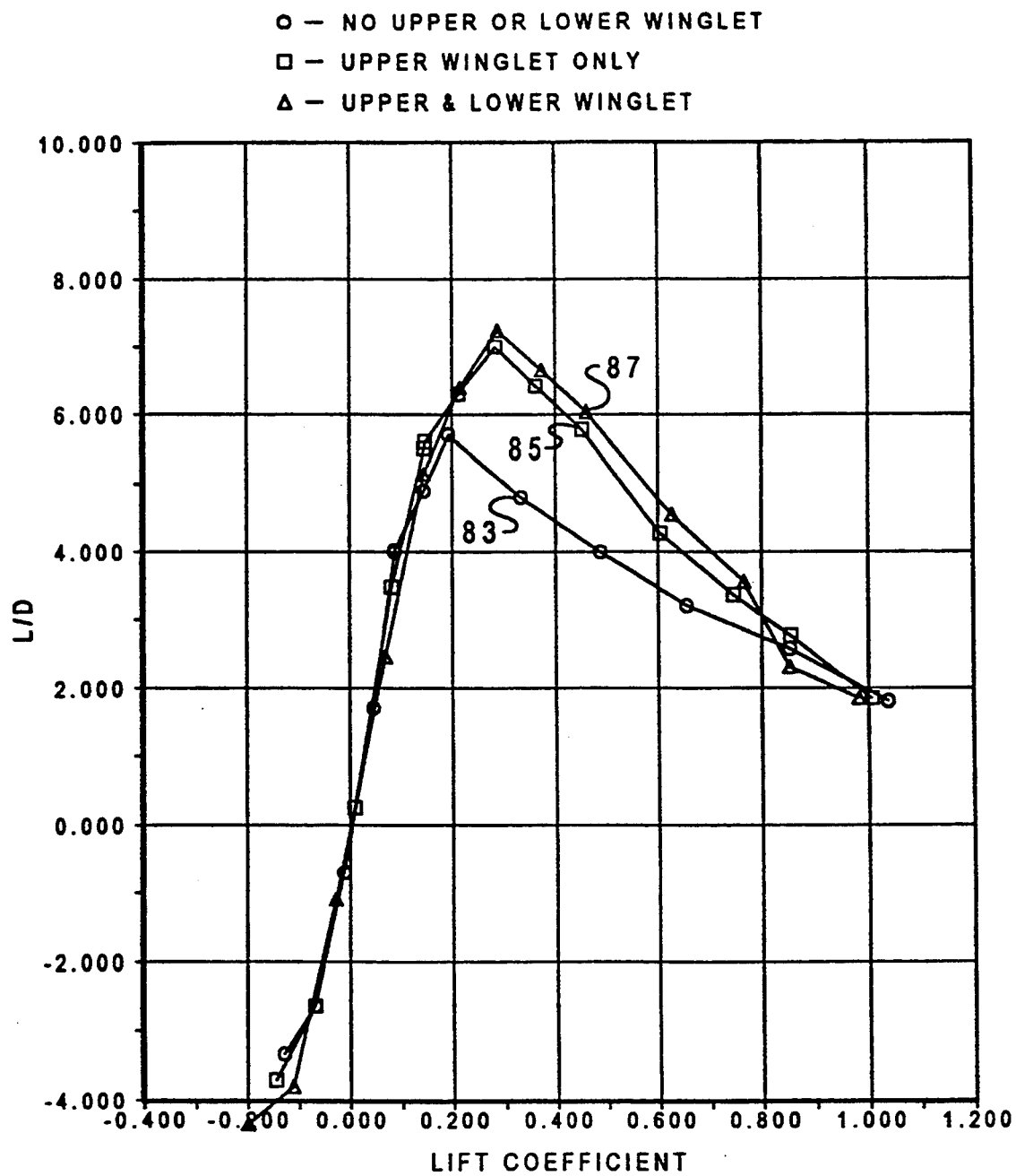
FIG. 7 is a graph of a wind tunnel test of the vehicle of FIG. 1, and comparing it to two other configurations of vehicles, the graph being a plot of lift over drag versus lift coefficient.
Figure 8:
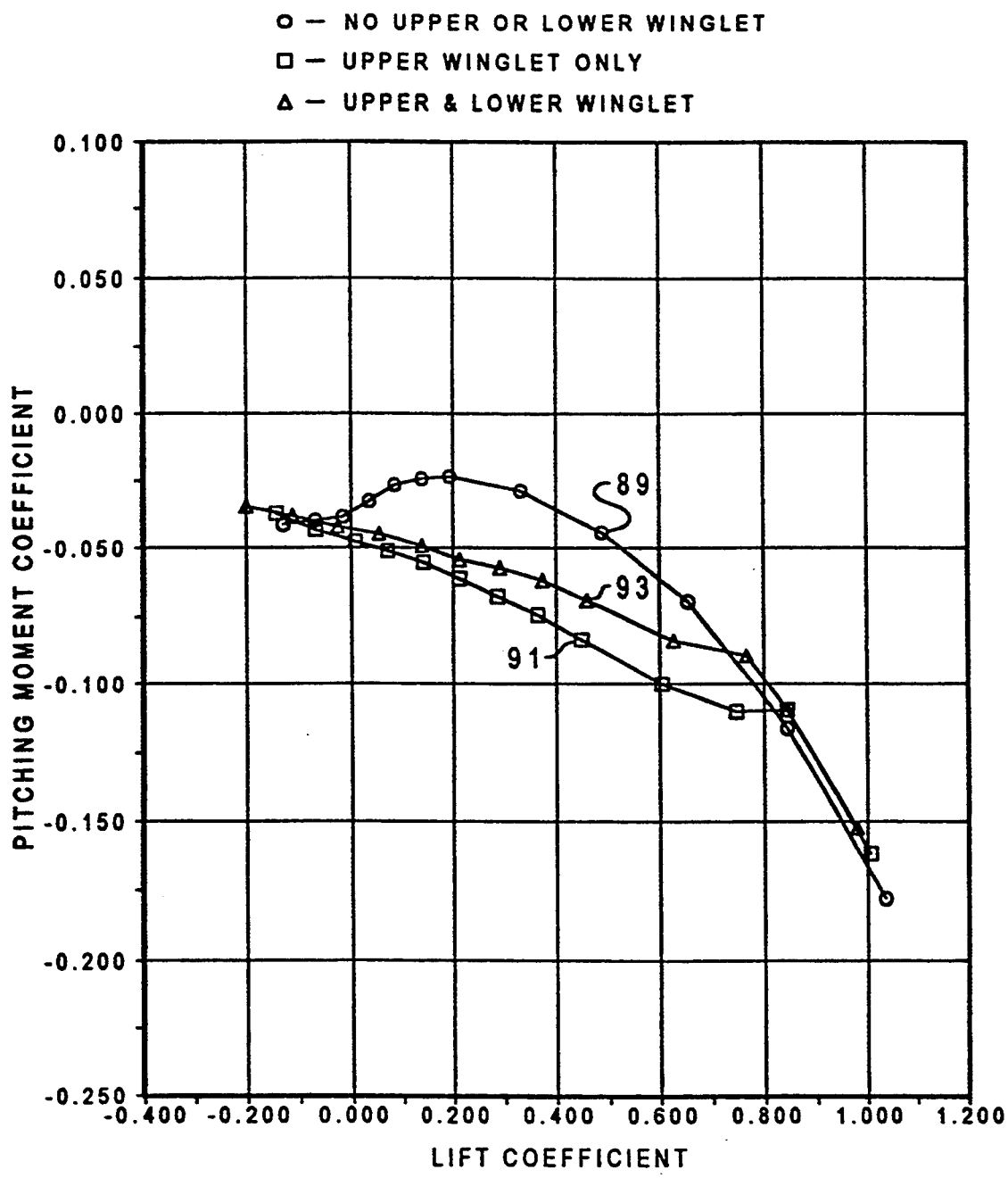
FIG. 8 is a graph of a wind tunnel test of the vehicle of FIG. 1, and comparing it to two other vehicles of different configurations, the graph being a chart of pitching moment coefficient over lift coefficient.

Referring to FIGS. 7 and 8, wind tunnel tests were conducted of a model constructed as shown in FIG. 1, with the exception of tail 17. In the model, no vertical tail was needed. Tail 17 and rudder 19 serve only for steering while taxiing. FIG. 7 shows a typical wind tunnel test of L/D, which is the lift divided by the drag, plotted against the lift coefficient. The L/D graph is a performance parameter indicating how efficient an aircraft is for a given range. The range of the aircraft is proportional to L/D. For example, if one doubles the L/D, the range (distance travelled) is doubled. The lift coefficient is a nondimensional value relating to the amount of lift. The lift coefficient increases with increasing angle of attack. The angle of attack is the inclination of the aircraft relative to forward movement. The test is performed by gradually raising the nose of the aircraft upward, increasing the angle of attack while measuring the lift coefficient and L/D.

At a very low angle of attack, there will be a very low lift coefficient. At low lift coefficients, the induced drag due to lift is low, and the drag due to skin friction is greater. At high angles of attack, the reverse occurs. Each of the curves 83, 85 and 87 has a peak. At the peak, the drag due to skin friction equals the drag due to lift.

Curve 83 is a graph that was run with the upper and lower winglets 31, 37 removed. Curve 85 is a graph run under the same circumstances, but with upper winglet 31 in place. Lower winglet 37 is not utilized in connection with curve 85. Curve 87 shows both upper winglet 31 and lower winglet 37 in place. Note that both curves 85 and 87 exceed curve 83 significantly from a lift coefficient around 0.2 up to about 0.8. The aircraft is at a stall above 0.8. This difference adds greatly to the performance of the airplane. For a given lift coefficient within the range from 0.2 to 0.8, the L/D is much better for curves 85 and 87 than curve 83. The curves 85, 87 show that the addition of the winglets 31, 37 enhances the flight characteristics. This occurs because the winglets 31, 37 reduce the tendency for the positive pressure air under wing 21 from flowing around side edges 29 to the upper surface of wing 21 where there is lower or negative pressure air. This reduces the induced drag due to lift and increases the L/D. Curve 87 as opposed to curve 85 shows that adding the lower winglet 37 adds to the performance, but not as much as the difference between curve 83 and curve 87.

FIG. 8 is another wind tunnel test, this one showing the pitching moment coefficient versus the lift coefficient. Again, a sweep of pitch angle was made during this test, with the lift coefficient and pitching moment being measured. The nose of the aircraft was gradually raised to increase the angle of attack as the graph was plotted. Curve 89 shows vehicle 11 without either the upper winglet 31 or the lower winglet 37. Curve 93 shows vehicle 11 being tested with both the upper and lower winglets 31, 37. Curve 91 shows vehicle 11 being tested, but with only the upper winglet 31.

FIG. 8 illustrates stability. Curve 89 shows both an increase in slope and a decrease in slope with a peak. The positive portion of the slope of curve 89 indicates instability below a lift coefficient of 0.2. This occurs at low angles of attack and higher speeds. Curve 89 indicates that at high speeds, the plane is inherently unstable with a tendency existing for the plane to nose over.

For stability, a negative slope is required through the range of normal flight. Curve 91 shows that using only an upper winglet 31, but not a lower winglet 37, provides a stable aircraft. Curve 93, which has both upper winglets 31 and lower winglets 37, also shows a negative slope, and therefore indicates stability. The difference between curves 91 and 93 is not significant. Considering the enhanced performance, of curve 87 (FIG. 7) over curve 85, the most desirable configuration utilizes both upper and lower winglets 31, 37.

Referring now to FIG. 9, aircraft 11' has lower winglets 37'. Each winglet 37' has on its trailing edge an aerilon 95. Aerilon 95 is used for controlling roll. In this instance, the control surfaces 27' would move in unison and would serve only as elevators. Otherwise, vehicle 11' operates in the same manner. The chord of lower winglet 37' is considerably shorter than the chord of lower winglet 37 of FIG. 1.

In operation, vehicle 11 is flown by take-off and landing from normal runways. The propeller 47 would be engaged by the clutch 53 to propel the vehicle 11 both during take-off and while taxiing. The hydraulic motors 73 (FIG. 5) would not be utilized for take-off or taxiing normally.

For roadway driving, the operator releases clutch 53 and locks the propeller 47 with brake 57. The operator will drive the vehicle using controls 59, 71 (FIG. 5). Hydraulic motors 73 will drive the wheels 43.

The invention has significant advantages. The vehicle will exhibit stable flight characteristics. It does not require extensible sections on the wings, which can be complex, expensive, and add weight. It has a very low aspect ratio, allowing it to be driven on roadways. The independently driven wheels, operated by a hydraulic pump, provide an efficient means to use the vehicle as a road vehicle. The lower winglets serve not only for increasing performance, but also to provide support for landing gear or wheels.

While the invention has been shown in only two of its forms, it should be apparent to those skilled in the art that it is not so limited, but is susceptible to various changes without departing from the scope of the invention. For example, the use of a planetary reduction clutch mechanism for the propeller is illustrative, and other means for clutching and locking the propeller could be used as well.

I claim:

1. A vehicle capable of flying as well as roadway driving, comprising in combination:

a fuselage having a cabin for housing an operator;

a fixed wing extending outward from each side of the fuselage, the wing having a fixed span from one side edge to the other side edge, the wing having a leading edge and a trailing edge with a chord from the leading edge to the trailing edge being at least equal to the span, the chord of the wing being substantially constant from the fuselage to each of the side edges;

a fixed upper winglet extending upward from each side edge of the wing, each of the upper winglets having a height extending from a junction with the wing to an upper edge of each of the upper winglets that is in the range of 0.3 to 0.65 times the span of the wing, each of the upper winglets having a chord from a leading edge to a trailing edge that is in the range from 0.2 to 0.6 times the chord of the wing measured halfway between the junction with the wing and the upper edge of each of the upper winglets;

wherein there is only a single one of the fixed wing in engagement with the upper winglet on each side of the fuselage;

movable flight control surface means mounted at the trailing edge of the wing for controlling flight of the vehicle;

an engine having a propeller drive shaft extending substantially parallel with the longitudinal axis of the vehicle;

a propeller mounted to the drive shaft of the engine and mounted forward of the wing for moving air over the wing;

clutch means mounted to the drive shaft for coupling the propeller to the engine for rotating the propeller and for selectively disengaging the propeller from rotation; and a set of wheels mounted to the vehicle and powered by the engine for selectively driving the wheels for roadway use.

2. The vehicle according to claim 1, further comprising:

a fixed lower winglet extending downward from each side edge of the wing.

3. The vehicle according to claim 1 wherein:

each of the upper winglets has a leading edge having an upper winglet leading junction with the wing, the upper winglet leading junction being located rearward of the leading edge of the wing; and wherein the vehicle further comprises:

a fixed lower winglet extending downward from each side edge of the wing, each of the lower winglets having a trailing edge having a lower winglet trailing junction with the wing, each of the lower winglet trailing junctions being located rearward from the leading edge of the wing by an amount at least equal to the amount that the leading edge of each of the upper winglets extends rearward from the leading edge of the wing.

4. The vehicle according to claim 1, further comprising:

a fixed lower winglet extending downward from each side edge of the wing, each of the lower winglets having a vertical height from the wing to a lower end of each of the lower winglets that is in the range from 0.25 to 0.35 times the span of the wing, each of the lower winglets having a chord from a leading edge to a trailing edge of each of the lower winglets that is in the range from 0.4 to 1.00 times the chord of the wing.

5. A vehicle capable of flying as well as roadway driving, comprising in combination:

a fuselage having a cabin for housing an operator;

a fixed wing extending outward from each side of the fuselage, the wing having a fixed span from one side edge to the other side edge, the wing having a leading edge and a trailing edge with a chord from the leading edge to the trailing edge being at least equal to the span, the chord of the wing being substantially constant from the fuselage to each of the side edges;

a fixed upper winglet extending upward from each side edge of the wing, each of the upper winglets having a height extending from a junction with the wing to an upper edge of each of the upper winglets that is in the range of 0.3 to 0.65 times the span of the wing, each of the upper winglets having a chord from a leading edge to a trailing edge that is in the range from 0.2 to 0.6 times the chord of the wing measured halfway between the junction with the wing and the upper edge of each of the upper winglets, each of the upper winglets having a leading edge junction with the wing which is spaced rearward from the leading edge of the wing;

a fixed lower winglet extending downward from each side edge of the wing and having a trailing edge junction with the wing that is farther from the leading edge of the wing than the leading edge junction of the upper winglet with the wing;

the upper and lower winglets reducing a tendency for positive air pressure under the wing from flowing around the side edges to an upper surface of the wing;

wherein there is only a single one of the fixed wing in engagement with the upper and lower winglets on each side of the fuselage;

movable flight control surface means mounted at the trailing edge of the wing for controlling flight of the vehicle;

an engine having a propeller drive shaft extending substantially parallel with the longitudinal axis of the vehicle;

a propeller mounted to the drive shaft of the engine and mounted forward of the wing for moving air over the wing;

a clutch mounted to the drive shaft for coupling the propeller to the engine for rotating the propeller and for selectively disengaging the propeller from rotation; and a set of wheels mounted to the vehicle and powered by the engine for selectively driving the wheels for roadway use.

6. A vehicle capable of flying as well as roadway driving, comprising in combination:

a fuselage having a cabin for housing an operator;

a fixed wing extending outward from each side of the fuselage, the wing having a fixed span from one side edge to the other side edge, the wing having a leading edge and a trailing edge with a chord from the leading edge to the trailing edge being at least equal to the span, the chord of the wing being substantially constant from the fuselage to each of the side edges;

a fixed upper winglet extending upward from each side edge of the wing, each of the upper winglets having a height extending from a junction with the wing to an upper edge of each of the upper winglets that is in the range of 0.3 to 0.65 times the span of the wing, each of the upper winglets having a chord from a leading edge to a trailing edge that is in the range from 0.2 to 0.6 times the chord of the wing measured halfway between the junction with the wing and the upper edge of each of the upper winglets, the leading edge of each of the upper winglets being spaced rearward from the leading edge of the wing by a significant distance;

a fixed lower winglet extending downward from each side edge of the wing, each of the lower winglets having a vertical height from the wing to a lower end of each of the lower winglets that is in the range from 0.25 to 0.35 times the span of the wing, each of the lower winglets having a chord from a leading edge to a trailing edge of each of the lower winglets that is in the range from 0.4 to 1.00 times the chord of the wing;

the upper and lower winglets reducing a tendency for positive air pressure under the wing from flowing around the side edges to an upper surface of the wing;

wherein there is only a single one of the fixed wing in engagement with the upper and lower winglets on each side of the fuselage;

movable flight control surface means mounted at the trailing edge of the wing for controlling flight of the vehicle;

an engine having a propeller drive shaft extending substantially parallel with the longitudinal axis of the vehicle;

a propeller mounted to the drive shaft of the engine and mounted forward of the wing for moving air over the wing;

a clutch mounted to the drive shaft for coupling the propeller to the engine for rotating the propeller and for selectively disengaging the propeller from rotation; and a set of wheels mounted to the vehicle and powered by the engine for selectively driving the wheels for roadway use.

* * * * *